Figure 1:
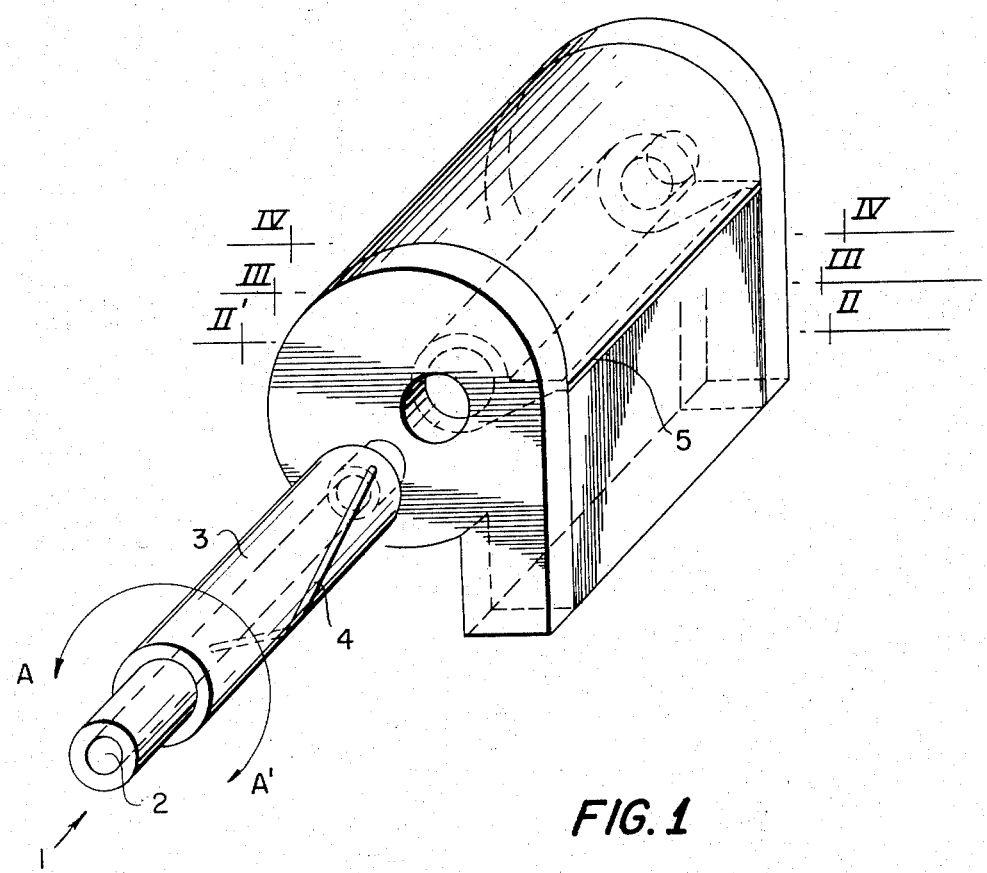

United States Patent [19]
Taureck et al.

[11] 3,806,293
[45] Apr. 23, 1974

[54] APPARATUS FOR THE PRODUCTION OF FILMS OR PLATES HAVING AN IMPROVED DISTRIBUTION OF THE THICKER AREAS

[75] Inventors: Jürgen Taureck, Wiesbaden-Biebrich; Gerhard Becht, Wiesbaden-Schierstein; Ludwig Klenk, Hallgarten; Hans Strutzel, Wiesbaden-Dotzheim, all of Germany

[73] Assignee: Kalle Aktiengesellschaft, Wiesbaden-Biebrich, Germany

[22] Filed: Dec. 29, 1971

[21] Appl. No.: 213,547

Related U.S. Application Data
[62] Division of Ser. No. 90,402, Nov. 17, 1970.

[30] Foreign Application Priority Data
Nov. 19, 1969  Germany .......................... 1958144

[52] U.S. Cl. ................. 425/209, 425/132, 425/466
[51] Int. Cl. ............................................. B29f 3/02

[58] Field of Search..... 425/209, 466, 467, 130–133

[56] References Cited
UNITED STATES PATENTS

| | | | |
|---|---|---|---|
| 2,803,041 | 8/1957 | Hill et al. ........................ | 425/132 X |
| 3,606,636 | 9/1971 | Glass et al. ...................... | 425/131 |
| 3,415,920 | 12/1968 | Lee et al. ........................ | 425/133 X |
| 3,274,646 | 9/1966 | Krystof ............................ | 425/133 |
| 826,442 | 7/1906 | Orr .................................. | 425/209 |
| 3,133,313 | 5/1964 | Corbett ............................ | 425/466 |
| 2,982,995 | 5/1961 | Groleau ........................... | 425/466 |
| 3,443,277 | 5/1969 | Frielingsdorf .................... | 264/70 X |
| 2,908,938 | 10/1959 | Taylor .............................. | 264/176 R |

*Primary Examiner*—R. Spencer Annear
*Attorney, Agent, or Firm*—James E. Bryan, Esq.

[57] ABSTRACT

This invention relates to an apparatus for the production of films or plates of plastic material, the apparatus comprising a die body, a die orifice in the body, movable sleeve means mounted at least partially in the body, and inlet and outlet means in the sleeve means.

10 Claims, 8 Drawing Figures

APPARATUS FOR THE PRODUCTION OF FILMS OR PLATES HAVING AN IMPROVED DISTRIBUTION OF THE THICKER AREAS

This is a division of application Ser. No. 90,402, filed Nov. 17, 1970.

The present invention relates to an apparatus for the production of plates and films by extruding thermoplastic materials, e.g., synthetic plastics, from a slot die wherein motion is imparted to the mass fed into the die in order to improve the distribution of the thicker areas of the film or plate.

Heretofore, it has not been possible in the manufacture of plates, sheeting or tubular films, to avoid the formation of thicker areas caused by differences in the flow behavior of the melt during extrusion. These "bulges," which are always in the same area, are particularly annoying in the end products, especially when films are wound up. When webs of film are taken up, thick bulges appear on the reel which are caused by the superimposed thicker areas of the film. The web of film becomes distorted in the region of the bulges, thus causing a substantial deterioration of the planar position of the film. Also when the plates or films are to be further processed, e.g., printed or laminated, such areas of increased thickness extending in the longitudinal direction of the film are very troublesome.

For these reasons, numerous attempts have been made to influence the melt during extrusion in order to reduce the thickness of the bulges and to distribute them transversely to the direction of extrusion. These attempts have shown that, although the thickness of the bulges can be reduced by certain measures, they cannot be altogether avoided. Therefore, it was the main object of all these investigations to achieve a more even distribution of the bulges.

In the production of blown films, measures are normally taken in order to cause the bulges appearing on the reel during take-up of the film to be displaced transversely to the direction of extrusion. This may be achieved, for example, by rotating or reversing the blow head, the cooling ring, or the flattening device. However, the means suitable for blown films cannot be applied to the extrusion of plates or films from a slot die.

It already has been suggested to shift the slot die or one of the subsequent treating stations, for example, the winding device, over a certain distance transversely to the direction of transport. In addition to the increased technical expenditure required, this also would cause an increase in waste, due to the wider margin which would have to be cut off, because, in order to produce straight edges, at least the distance corresponding to the lateral shift would have to be cut off at each side.

Therefore, it was the object of most of these attempts to influence the flow behavior of the melt. From German Pat. No. 1,052,673, for example, a slot die of an extruder is known in which the melt is stirred during the extrusion process by means of an agitator disposed within the die. German Pat. No. 1,127,575, describes a modification of this agitator, in which all zones within the interior of the die are treated by means of pins attached to the agitator. Published German Pat. No. 1,194,125, deals with the arrangement of a screw in addition to an agitator. Further, German Pat. No. 1,232,335, describes a stirring rod arranged in the interior of the die as a means for stirring the melt. Further, a slot die is known from Swiss Pat. No. 390,534, in which the stirring element arranged in the interior of the die body rotates simultaneously around its own axis and around the central axis of the die channel.

Other groups of devices, which are much less relevant to the present invention and are mentioned in this connection for the sake of completeness only, serve the purpose of eliminating the flow problem from the feed end of the slot die. Thus German Published Pat. No. 1,179,702, deals with screws which are arranged in series and cause a coarse or very fine distribution of the melt, and U.S. Pat. No. 3,217,358, deals with a conveyor screw which tapers in the direction of the extruder.

According to U.S. Pat. No. 3,341,388, the flow behavior is influenced by providing several heating elements which enable the melt to be heated by zones.

German Published Pat. No. 1,178,200, is also concerned with ways and means of influencing the bulges, the extruded film web being introduced under tension into a liquid bath, where a bunched stream of liquid is beamed upon the film transversely to the direction of feed.

Although the above-described devices, in which stirring means are used, have the advantage that they avoid dead zones within the dies, which otherwise might contribute to long dwell periods in the die and thus to a decomposition of the melt, they do not cause a noticeable improvement as regards the bulges, and, in the case of low viscosity melts, even lead to a deterioration. The measures mentioned above are unsuitable for influencing the distribution of the bulges, because they do not (or only insignificantly) change the position of the flow lines of the melt.

Others of the devices mentioned above are technically expensive, without essentially influencing the flow lines of the melt, or, as in the case of the cooling bath, cannot be generally applied.

The present invention provides a technically simple solution for an improvement of the distribution of the bulges occurring during the extrusion of films or plates of thermoplastic material, by which the disadvantages of the known processes and apparatuses are avoided.

This is achieved by means of an extrusion apparatus, followed by cooling apparatus for cooling of the sheet material, in which a rotary or oscillating or reciprocating motion, or preferably a combination of such motions, is imparted to the entire mass fed into the die body before it emerges from the die. By causing the entire mass of the melt fed into the die to continuously execute a rotary, oscillating, or reciprocating motion, or a combination of such motions, relative to the stationary die slot, before leaving the die, the flow lines are continuously displaced transversely to the direction of issue of the web of material. In this manner, bulges extending in straight lines, and the disadvantages connected with them, are avoided.

In a preferred embodiment of the invention, the motion imparted to the mass fed into the die is a combination of a rotary or oscillating motion and a reciprocating motion.

In principle, the apparatus of the invention is suitable for extruding thermoplastic materials of all kinds, but it may be applied with particular advantage to the extrusion of synthetic plastics. In practice, it has proved to be particularly suitable for thin materials, in particular webs of thin plastic film, which are known to be prone to distortions on the reel. The sheet materials produced according to the process of the invention are much more advantageous in their behavior than are sheet materials manufactured by prior art processes, particularly when they are further processed, e.g., printed, laminated to other materials, or coated by any type of process.

The apparatus of the invention is of particular advantage when it is employed in the preparation of webs of polyolefin films, such as polyethylene or polypropylene films, or of combinations of these with other synthetic materials, e.g., polystyrene, polyvinyl chloride, polyesters or polyamides, or of copolymers of these compounds.

Figure 2:
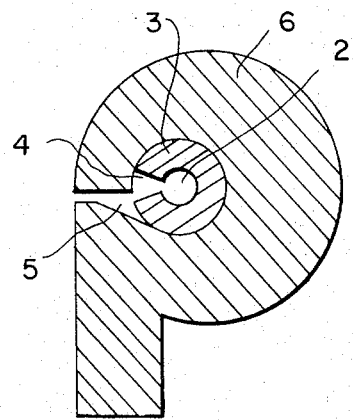
Figure 3:
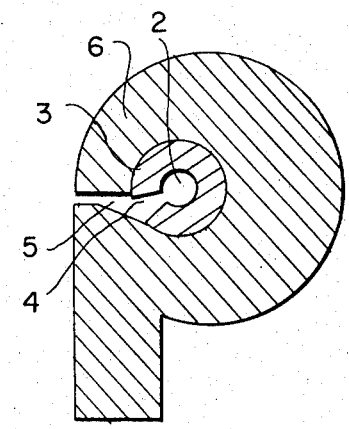
Figure 4:
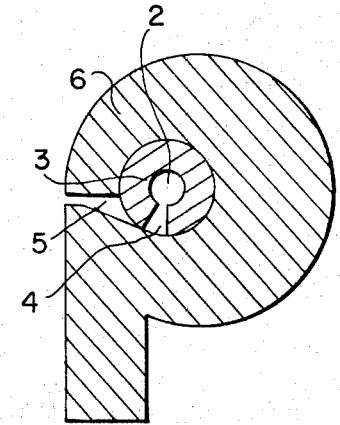
Figure 5:
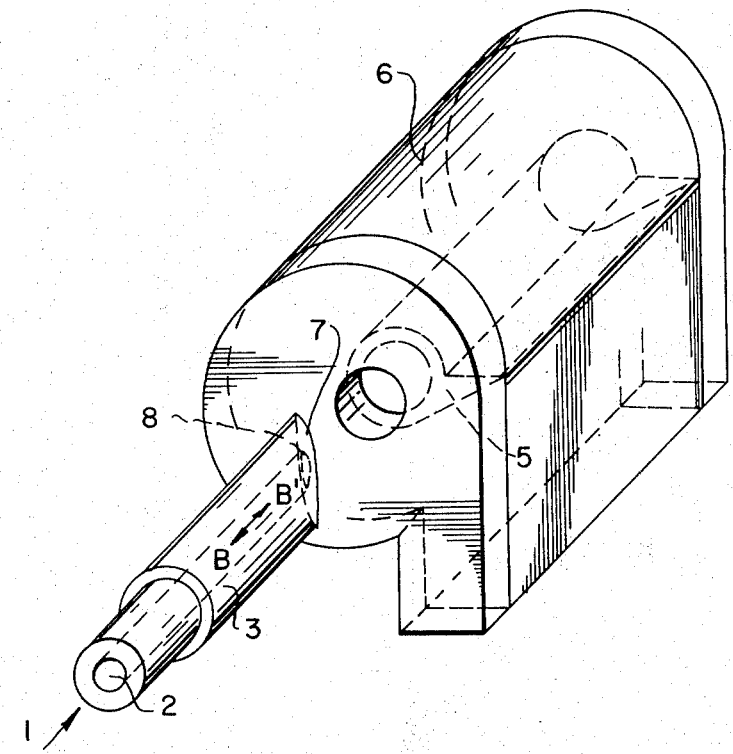
Figures 6, 7:
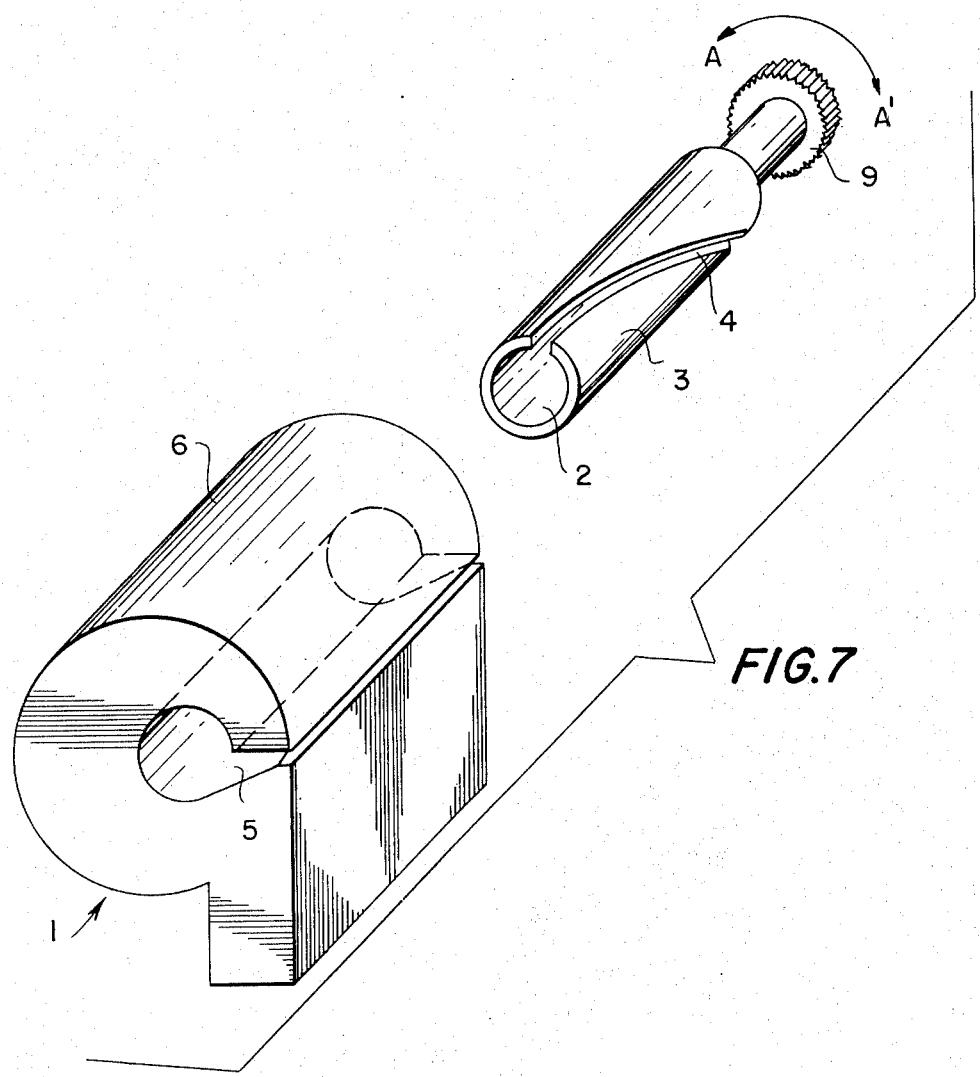

Apparatuses suitable for carrying out the invention are shown in FIGS. 1 to 7, of the accompanying drawings in which:

FIG. 1 is a diagrammatic representation of a slot die, with the sleeve removed,

FIGS. 2 to 4 show sections of FIG. 1, taken along the lines II–II', III–III', and IV–IV' of FIG. 1, with the sleeve in position, FIG. 5 is a diagrammatic representation of a slot die according to FIG. 1, with the sleeve removed, which is modified as compared with FIG. 1, FIG. 6 is a detail of FIG. 5, showing a plan view of the bevelled end of the sleeve, FIG. 7 is a diagrammatic representation of a slot die, with the sleeve removed, which is modified as compared with FIG. 1, and FIG. 8 is a diagrammatic representation of a slot die, with the sleeve removed, which is modified as compared with FIG. 1.

In the following, the apparatuses will be explained in detail by reference to the various figures: FIG. 1 shows a die body 6 with the die orifice 5. The sleeve 3 — which for the sake of clarity is shown outside of the die body — is movably positioned within the bore of the die body, and, in this embodiment of the invention, executes a rotary motion in the direction A–A'. The rotary motion may consist of an oscillating or a revolving motion, depending on the kind of operating mechanism attached to the sleeve. The motion imparted to the sleeve may be effected by known devices and is transmitted to the sleeve by likewise known machine parts, such as cog wheels, toothed segments, eccentrics, connecting rods, and the like. However, since these parts do not concern the invention, they are not illustrated. From an extruder (not shown), the melt 1 is fed through the opening 2 into the sleeve 3 and leaves it through the opening 4. Since the sleeve executes a rotary motion, the entire mass is shifted to and fro along the elongated die orifice. In this manner, the flow lines and, consequently, the bulges which form move transversely to the direction of feed of the extruded plate or film. The outlet opening 4 of the sleeve is arranged in an oblique position to the die orifice, and, in a preferred embodiment, winds around substantially the entire circumference of the sleeve.

Further, it has been found when practicing the invention that it is of advantage in many cases to superpose the rotary motion by an axial motion of the sleeve, i.e., a displacement of the sleeve along the elongated die orifice. In this manner, a particularly even distribution of the bulges is achieved. In this embodiment of the invention, the sleeve has customary devices and machine parts attached thereto (not shown in the drawings) to effect the rotary motion and axial motion thereof.

In a further embodiment of the latter apparatus, the inlet opening 2 passes completely through the sleeve, so that part of the melt can issue from the end of the sleeve 3, in addition to the portion emerging from the outlet opening 4.

In a further embodiment of an apparatus, in which the sleeve executes only a rotary motion, the inlet opening 2 and the bore within the die body 6 are of such construction that they pass through the entire die body. With this embodiment, the melt is fed in from both ends, by two extruders, thus resulting in a feed having the form of a double L. By this construction, the torsion is reduced in the desired manner, particularly in the case of relatively long sleeves.

In FIGS. 2 to 4, the position of the outlet opening 4 relative to the die orifice 5 is shown in several sectional planes of FIG. 1. It can be seen from the figures how the mass fed into the die is displaced, with respect to the stationary die orifice, by the rotary movement of the sleeve.

FIG. 5 shows the same die body 6 and the same die orifice 5 as in FIG. 1, with the sleeve 3 shown outside of the die body for the sake of clarity. The melt 1 issuing from the extruder enters the sleeve 3 through the inlet opening 2 and leaves it through the outlet opening 8. During the extrusion of a plate or film, an axial motion in the direction B–B' is imparted to the sleeve by means of known devices. In order to avoid even minor dead zones within the die, at the outlet opening 8, the end of the sleeve is preferably bevelled. In addition to the axial motion, a rotary motion may be simultaneously imparted to the sleeve, which may be in the form of a rotation or an oscillation.

FIG. 6 is a detail of the sleeve of FIG. 5, in which the bevelled end 7 and the outlet opening 8 of the sleeve are shown as a plan view.

FIG. 7 shows still another embodiment of the movable sleeve. (The die body 6 is shown without its front surfaces). The melt 1 is fed into the inlet opening 2 of the sleeve 3 from the side away from the drive. The outlet opening 4 of the sleeve, which extends obliquely to the die orifice 5, is in the form of an uninterrupted slot extending almost to the end of the sleeve. The rotary motion, in the direction indicated A–A', is imparted to the sleeve by means of a cog wheel 9.

FIG. 8 shows still another embodiment of the moveable sleeve (The die body 6 is shown without its front surfaces.) in which the outlet opening also may consist of closely adjacent perforations 10 or of a combination of perforations and slots, instead of being in the form of a continuous slot.

It will be obvious to those skilled in the art that many modifications may be made within the scope of the present invention without departing from the spirit thereof, and the invention includes all such modifications.

What is claimed is:

1. An extrusion apparatus, useful in the extrusion of one-layer films or plates of plastic material having an improved distribution of the thicker areas transversely to the direction of extrusion, comprising a housing having a slot die opening and a bore and sleeve means moveably mounted in said bore of said housing, said sleeve means having inlet means for the plastic material to be fed into it under pressure and a helical outlet opening said sleeve means being connected with means for moving said sleeve and helical outlet opening in such a manner as to distribute the flow lines of the plastic material extruded through said slot die opening continuously transversely to the direction of extrusion when said sleeve means is moved.

2. An extrusion apparatus according to claim 1 in which the sleeve means is rotatably mounted.

3. An extrusion apparatus according to claim 1 in which the sleeve means is oscillatably mounted.

4. An extrusion apparatus according to claim 1 in which the sleeve means is reciprocatably mounted.

5. An extrusion apparatus according to claim 1 in which the sleeve means is mounted for a combination of rotary, oscillating and reciprocating motion.

6. An extrusion apparatus according to claim 1 in which the outlet means extends substantially over the entire circumference of the sleeve means oblique to the die opening.

7. An extrusion apparatus according to claim 6 in which the outlet means consists of at least one continuous slot.

8. An extrusion apparatus according to claim 6 in which the outlet means is a plurality of bores.

9. An extrusion apparatus, useful in the extrusion of one-layer films or plates of plastic material having an improved distribution of the thicker areas transversely to the direction of extrusion, comprising a housing having a slot die opening and a bore and sleeve means moveably mounted in said bore of said housing, said sleeve means having inlet means for the plastic material to be fed into it under pressure and outlet means in the form of a bevelled end of said sleeve means and said sleeve means being connected with means for reciprocating movement of said sleeve and outlet means in such as manner as to distribute the flow lines of the plastic material extruded through said slot die opening continuously transversely to the direction of extrusion when said sleeve means is moved.

10. An extrusion apparatus according to claim 9 in which the sleeve means is additionally connected with means for rotary and oscillating movement.

* * * * *